United States Patent [19]
Oda et al.

[11] Patent Number: 5,174,214
[45] Date of Patent: Dec. 29, 1992

[54] RADIAL TIRE FOR LEVITATION-TYPE VEHICLE

[75] Inventors: Kazuhiro Oda; Hideyuki Takizawa; Masayoshi Azakami, all of Kokubunji; Yukimasa Yamada, Tokorozawa; Masahiro Kuroda, Higashimurayama, all of Japan

[73] Assignee: Bridgestone Corporation; Railway Technical Research Institute, both of Toyko, Japan

[21] Appl. No.: 480,811

[22] Filed: Feb. 16, 1990

[30] Foreign Application Priority Data

Feb. 22, 1989 [JP] Japan .................................. 1-40398
Dec. 5, 1989 [JP] Japan .................................. 1-316148

[51] Int. Cl.$^5$ .................. B60L 13/04; B60C 3/00; B60C 11/00; B60C 9/18
[52] U.S. Cl. .................... 104/282; 152/454; 152/526; 152/538; 152/209 R
[58] Field of Search ............ 152/454, 526, 538, 209R, 152/201 D; 505/902, 903, 904, 905, 906, 907, 908; 104/281, 286, 284, 23.1, 23.2, 282, 283, 285

[56] References Cited

U.S. PATENT DOCUMENTS 1,091,379 3/1914 Mussinan ............................. 152/454
4,722,378 2/1988 Carolla et al. ..................... 152/209 R

FOREIGN PATENT DOCUMENTS 0203889 6/1959 Austria .................................. 152/531
0323519 7/1989 European Pat. Off. .
3439103 5/1986 Fed. Rep. of Germany .
0265003 11/1987 Japan .................................. 152/454
527995 10/1940 United Kingdom .
8900113 1/1989 World Int. Prop. O. .

Primary Examiner—Michael W. Ball
Assistant Examiner—Nancy T. Krawczyk
Attorney, Agent, or Firm—Oliff and Berridge

[57] ABSTRACT

In a tire for a levitation-type vehicle for supporting a load which varies depending upon a change in speed of the levitation-type vehicle at landing and during subsequent traveling thereof, a configuration of a crown and rigidity of the crown are set so as to have a ground-contact configuration in which, when a load of the levitation-type vehicle is equal to or less than 45% at its full load, a ratio of a ground-contact length of a pair of shoulders in a circumferential direction of the tire with respect to a ground-contact length, in the circumferential direction of the tire, of a central portion of the crown in the widthwise direction is 0.6~1.5. Accordingly, the tire for the levitation-type vehicle has a wide ground-contact area at an initial stage of landing and traveling.

13 Claims, 14 Drawing Sheets

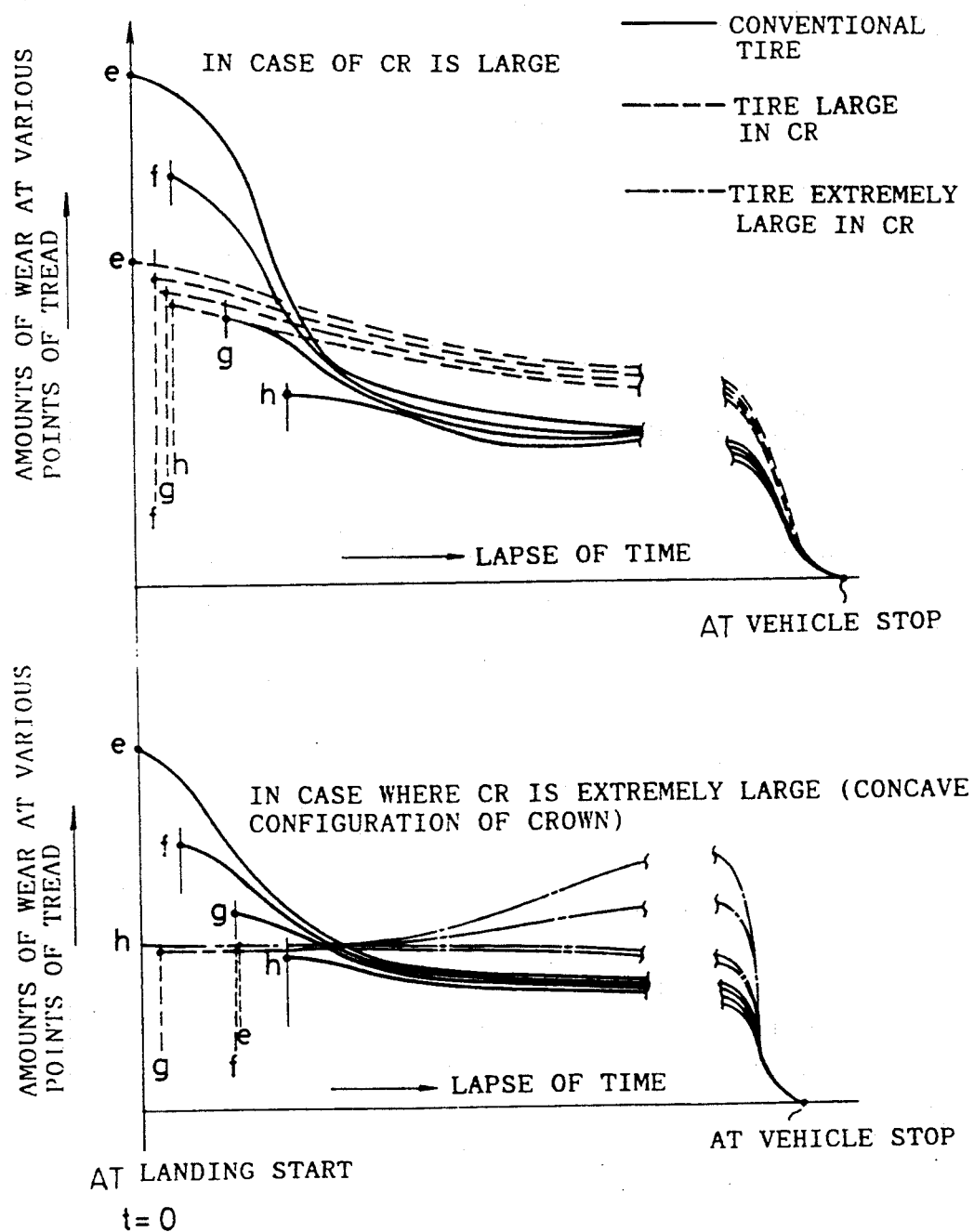

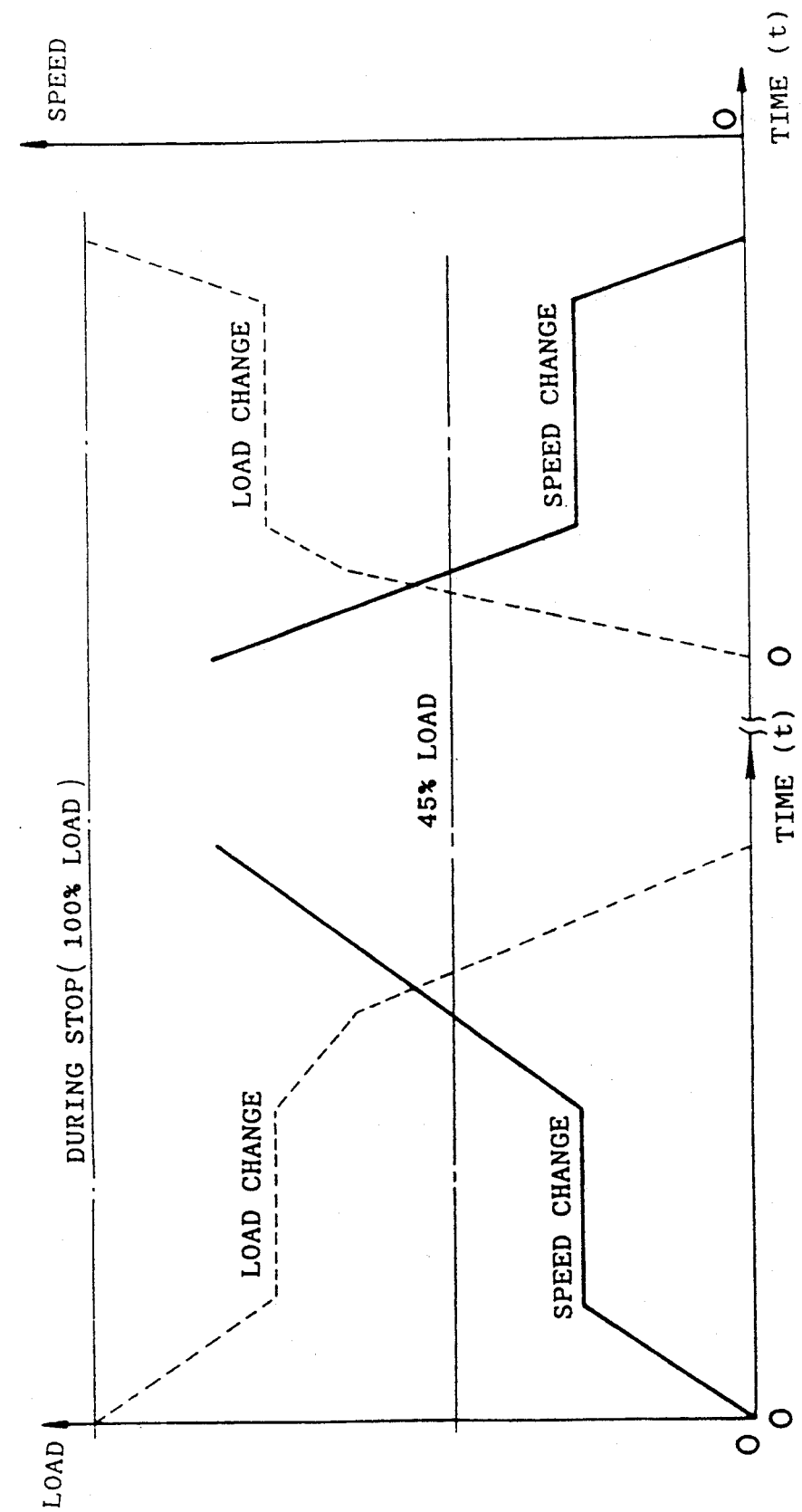

RADIAL TIRE FOR LEVITATION-TYPE VEHICLE

BACKGROUND OF THE INVENTION

1. Field of the Invention

The present invention relates to a radial tire for a levitation-type vehicle, which is used for example a the time of landing and taking-off of a linear-motor car which is levitated and travels under the action of magnetism.

2. Description of the Related Art

At present, a magnetic levitation-type vehicle (hereinafter referred to as "linear-motor car") has been developed. The linear-motor car has a vehicle body which is levitated from a road surface of a U-shaped cross-section guide way, by magnetic force acting between the vehicle body and the road surface. The magnetic force acting between sidewalls of the guide way and the vehicle applies propulsive force to the vehicle body to run the vehicle body along the guide way under a non-contact condition. Theoretically, the levitation height may be of the order of a few millimeters. However, in consideration of a characteristic of Japan that it is a country having frequent occurrence of earthquakes, a superconductive magnet is used to create a strong magnetic field in order to achieve a levitation height of the order of 100 mm.

In connection with the above, in such a linear-motor car, it is necessary to support and guide the vehicle body with respect to the road surface at landing and taking-off. To this end, tires for the linear-motor car have been developed.

As shown in FIG. 5, the load, which is received by the tires of the linear-motor car, changes or varies depending upon time and speed. That is, at the beginning of taking-off, the tires receive all of the load of the linear-motor car, but since a magnetic levitation force increases in accordance with an increase in the speed, the load applied to the tires decreases gradually, and comes to zero after taking-off. Further, at landing, the load is applied gradually to the tires from a non-load condition accompanied by a decrease in the speed, in contrast to the aforesaid taking-off condition. After stopping, the tires receive all of the load of the linear-motor car. In this manner, the condition at which the load applied to the tires varies depending upon time, does not exist in the case of tires which are used for an ordinary automotive vehicle. Further, the tires for the linear-motor car are also different from those for aircraft, and are under a slip condition between the tires and the surface of the roadway at landing for a relatively long period of time within a low load range. Accordingly, a wear condition of the tires is completely different from that of the tires for aircraft. With the tires for the linear-motor car, which are used under special conditions at landing and taking-off, the tires are in contact with the road surface particularly at landing under the low load for a relatively long period of time. Accordingly, in the case where conventional tires are used for the linear-motor car, a ground-contact configuration of the linear-motor car tire at the time of full load (at a load of 100%) has, as shown in FIG. 4a, a ground-contact length A of a central portion longer than a ground-contact length B of each of a pair of shoulders. Thus, within the low-load range, i.e., at a load equal to less than 45% of the full load of the vehicle, only the central portion of the tire in the widthwise direction thereof is in contact with the ground as shown in FIG. 4b. Consequently, wear on the tread (crown) of the tire, particularly, on the central portion of the tire in the widthwise direction, i.e., slip wear on the central portion increases. Accordingly, there is an urgent need for development of tires exclusively for use on the linear-motor car.

In other words, at landing, the tires of the linear-motor car are in sliding contact with the road surface at high speed for a relatively long period of time under a low-load condition. Accordingly, there is a particular increase in wear on the central portion of the crown of the tire so it is necessary to reduce the wear in this region.

Referring to FIGS. 4c and 4d, a mechanism of wear on the widthwise central portion of the tire of a conventional tire applied to a linear-motor car having a form in which the widthwise central portion projects will be decreased.

In FIG. 4c, a point e indicates the widthwise central portion of the tire, a point h indicates a contact point with the road surface in the neighborhood of one of the shoulders of the tire, and points f and g indicate intermediate points between them. Further, in FIG. 4c, in the condition indicated by the solid lines only the point e is in contact with the road surface, while in the condition indicated by the double dotted lines the crown of the tire is in contact with the road surface over its entirety in the widthwise direction thereof.

In FIG. 4d, the area indicated by E represents the amount of wear at point e. The area indicated by F represents the amount of wear at point f. The area indicated by G represents the amount of wear at point g. The area indicated by H represents the amount of wear at point h. Further, in FIG. 4d, the amount of wear (W) can be expressed by the following relationship:

$$W \propto (\text{Vehicle Speed})^2 \times (\text{Ground-Contact Pressure At Each Point Of Crown On The Basis Of Vehicle Load})$$

In connection with the above equation, the vehicle speed was a strong correlation to dependence on the slip ratio.

On the basis of FIG. 4d, the total amounts of wear at the respective various points are related as follows:

$$E > F > G > H$$

As a result, it will be understood that the amount of wear at point e, that is, at the widthwise central portion of the tire is extremely large.

On the basis of FIG. 4d, the reason why the amount of wear of the tire is particularly large at the point of time when the load applied to the tire is equal to or less than 45% of the full load is that a slip phenomenon is particularly large between the tire and the road surface up until this point of time. If the load applied to the tire exceeds 45% of the full load, the slip phenomenon becomes very much less.

Further, FIG. 4e shows a comparison between an amount of wear of the conventional tire (small in radius of curvature (CR)), an amount of wear of a tire where the radius of curvature of the crown of the tire is large, and where the radius of curvature of the crown of the tire is extremely large with respect to time. In FIG. 4e, the upper graph shows a comparison between the conventional tire and a tire where the radius of curvature of the crown is large. The lower graph shows a comparison between the conventional tire and a tire where the radius of curvature of the crown of the tire is extremely large, that is, where the crown has a nearly concave configuration. Moreover, in FIG. 4e, the points e, f, g and h indicate points the same as those shown in FIG. 4c. The solid lines represent the conventional tire. The broken lines indicate the tire where the radius of curvature of the crown is large, while the chain lines reveal the case of a tire where the radius of curvature of the crown is extremely large. FIG. 4e shows the amount of wear from landing start to stop at the points e, f, g and h. The areas covered by the respective curves represent the amounts of wear at the respective points. From FIG. 4e, the tire in the case where the radius of curvature of the crown is extremely large has a larger amount of wear at the ground-contact point (point h) in the vicinity of the shoulder of the tire than the widthwise center (point e) of the tire. That is, it can be seen that the area covered by the curve for point h > the area covered by the curve for point e. In this connection, the total amount of wear of the tire is substantially the total sum of the areas covered by the respective curves which represent the respective points, and the total amount of wear of the aforesaid three types of tires is substantially the same.

SUMMARY OF THE INVENTION

In view of the above circumstances, it is an object of the present invention to provide a radial tire for a levitation-type vehicle, in which a load received at the time of landing of the levitation-type vehicle is taken by an optimum ground-contact configuration of the tire, whereby wear resistance can be improved.

According to the invention, there is provided a tire for a levitation-type vehicle, in which at least one ply-cord layer forming a carcass has a plurality of cords which are arranged substantially in a radial direction, in which a plurality of belt layers composed of a plurality of reinforcing cord layers are interposed at a crown between an outer surface thereof and the carcass, and in which a load which varies depending upon a change in speed of the levitation-type vehicle is supported at landing and during subsequent traveling thereof, wherein at least one of a configuration of the crown and rigidity of the crown is set so as to have a ground-contact configuration in which a ratio (B/A) of a ground-contact length (hereinafter referred to as "ground-contact length of shoulders") B of a pair of shoulders at the crown in a circumferential direction of the tire for the levitation-type vehicle with respect to a ground-contact length (hereinafter referred to as "ground-contact length of a central portion") A of a substantially widthwise central portion of the crown in the circumferential direction of the tire for the levitation-type vehicle is 0.6 ~ 1.5 when a load reaching 45% of the full load of the levitation-type vehicle is applied to the tires. Along with an increase in load applied to the tires at landing and during subsequent traveling of the vehicle, the ratio B/A, at the ground-contact configuration of the tires, approaches a value within the 0.6 to 1.5 range when the load is 45% of full load.

In the invention constructed as above, and represented in FIGS. 3 and 4, when the levitation-type vehicle lands, the load received by the tire increases gradually due to contact between the tire and the road surface. Here, however, since the configuration of the crown or the rigidity of the crown is set so as to have such a ground-contact configuration such that the ratio of the ground-contact length B of the shoulders with respect to the ground-contact length A of the central portion under a load reaching 45% of the full load is 0.6 ~ 1.5, the load is received substantially uniformly in the widthwise direction of the tire for the levitation-type vehicle at a load equal to or less than 45% of full load in which the wear on the tire for the levitation-type vehicle, is sever. Thus, it is possible to prevent wear from only occurring on the central portion of the crown in the widthwise direction.

A diagram for explanation of the affect of the areas of the ground-contact configurations of the tire according to the invention is given in FIG. 12. According to the diagram, the object of the invention is fulfilled if the ground-contact configuration of the tire is such that the ratio B/A varies so as to passe through a region where its value is from 0.6 ~ 1.5 over a period of time when a load reaching 45% of the full load of the vehicle is applied to the tire.

BRIEF DESCRIPTION OF THE DRAWINGS

FIG. 5 is a characteristic view showing loads which are applied to the tire when the linear-motor car lands and takes off;

PREFERRED EMBODIMENTS OF THE INVENTION

First Embodiment

Figure 1:
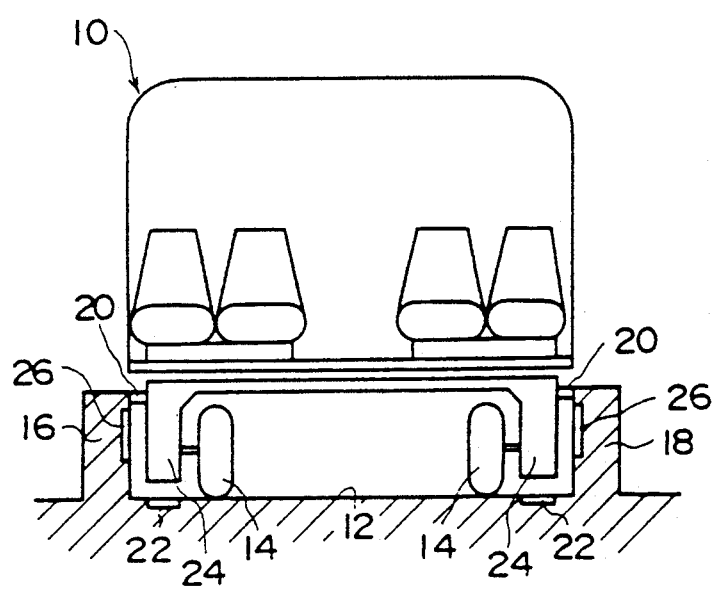
FIG. 1 is a front elevational view of a linear-motor car.

In FIG. 1, a linear-motor car 10 to which the invention is applied is shown. The linear-motor car 10 is supported on a guide way 12 through a plurality of radial tires 14 (hereinafter referred to simply as "tires 14") for a levitation vehicle. The guide way 12 has a pair of upstanding sidewalls 16 and 18 which correspond respectively to both sidewall surfaces of the linear-motor car 10. A plurality of guide tires 20 are mounted to each of the sidewall surfaces of the linear-motor car 10. The guide tires 20 have respective rotational axes which extend perpendicularly to a road surface on a bottom surface of the guide way 12 and are in contact with the sidewalls 16 and 18.

A pair of levitation coils 22 and 22 are laid on a surface of the guide way 12. Magnetic force, which acts between a pair of superconductive magnets 24 and 24 mounted on the linear-motor car 10 and the respective levitation coils 22 can levitate the linear-motor car 10 per se through approximately 100 mm with respect to the guide way 12. A pair of propulsive guide coils 26 and 26 are mounted respectively to the sidewalls 16 and 18. The linear-motor car 10 is propelled by magnetic force which acts between the propulsive guide coils 26 and the superconductive magnets 24 mounted on the linear-motor car 10.

The linear-motor car 10 is levitated when the speed of the linear-motor car 10 reaches a predetermined speed. Below the predetermined speed, the linear-motor car 10 is supported on the road surface by the tires 14. That is, the tires 14 function to support the linear-motor car 10 while stationary and during landing and take-off. In this connection, the tires 14 are accommodated respectively into accommodating rooms (not shown) during normal traveling of the linear-motor car 10.

Figure 2:
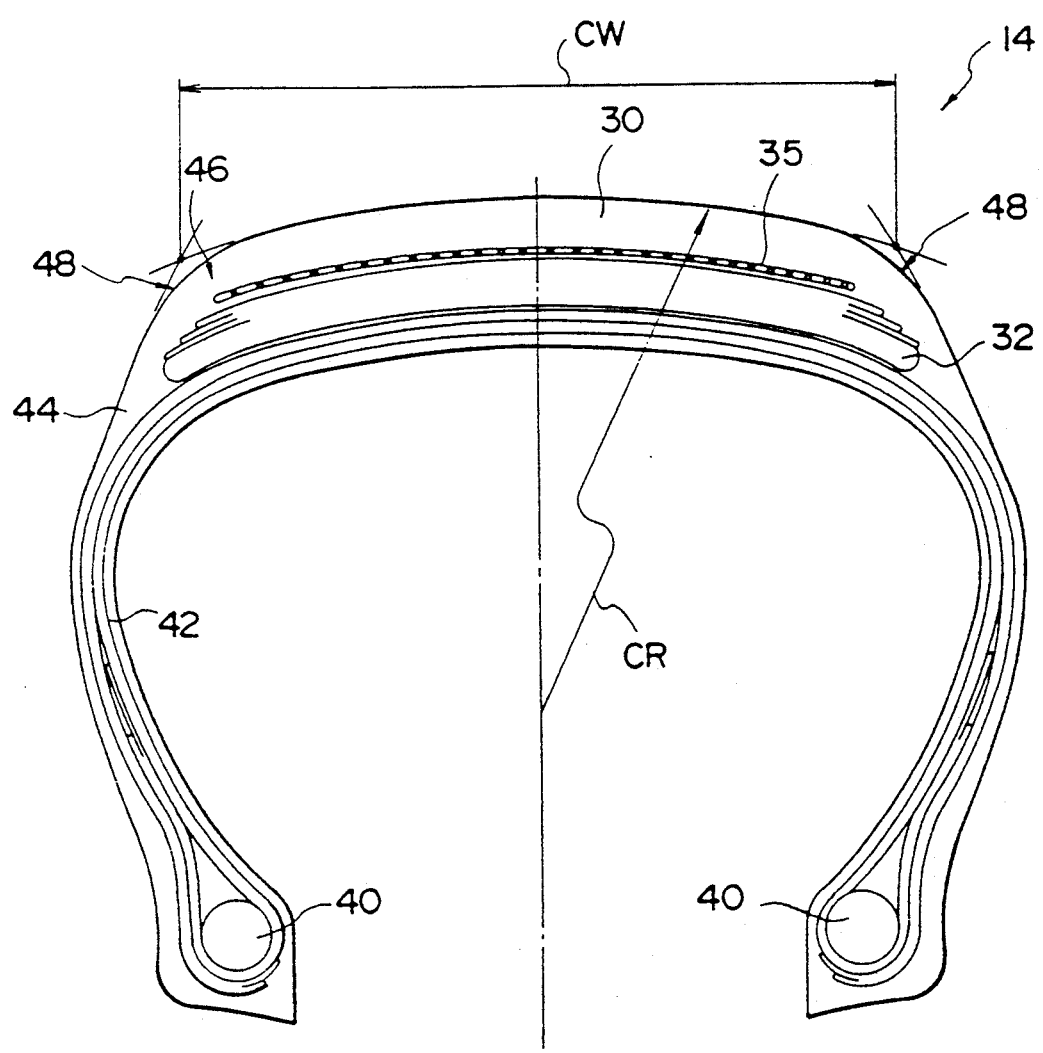
FIG. 2 is an enlarged cross-sectional view showing a crown of a tire according to a first embodiment of the invention, with hatching of a rubber layer omitted.

As shown in FIG. 2, each of the tires 14 is constructed as follows. A pair of bead cores 40 and 40 are formed into respective ring shapes around a rotational axis of the tire 14. A carcass 42 has both its end portions in a tire widthwise direction, wound respectively about the bead cores 40. The carcass 42 has a substantially C-shaped cross-section in a radial direction of the tire. A plurality of belt layers 32 are arranged annularly around the radially outer side of the carcass 42. A protective layer 35 is arranged annularly around the outside of the belt layers 32. The above-described components are covered by a rubber body 44. A portion of the rubber body 44, which is in contact with the guide way 12 (refer to FIG. 1), that is, the radially outer side, is formed as a thick tread 46. In the tread 46, the region in the neighborhood of both sides thereof in the tire widthwise direction, wherein a radius of curvature of the tread 46 decreases, is formed into a pair of shoulders 48 and 48, and the portion of the tread 46 between the shoulders 48 is called a crown 30.

Figure 3:
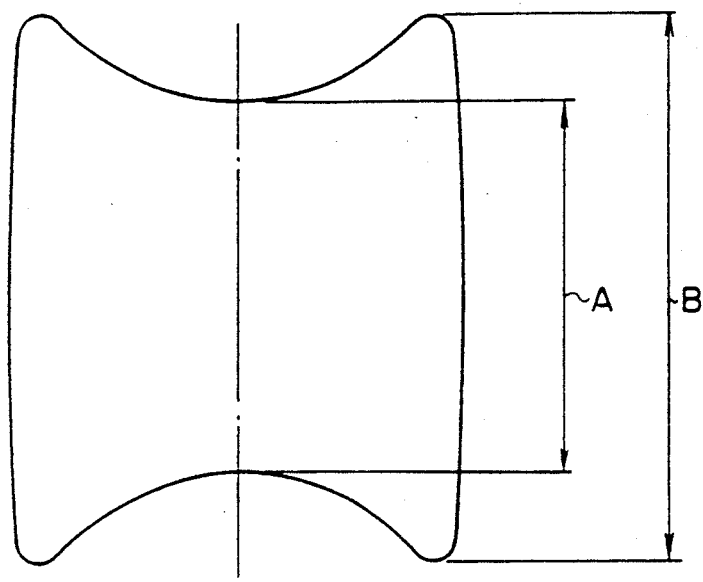
FIG. 3 is a view for explanation of a ground-contact configuration in which a ground-contact length A of a central portion is shorter than a ground-contact length B of each of a pair of shoulders.
Figure 4:
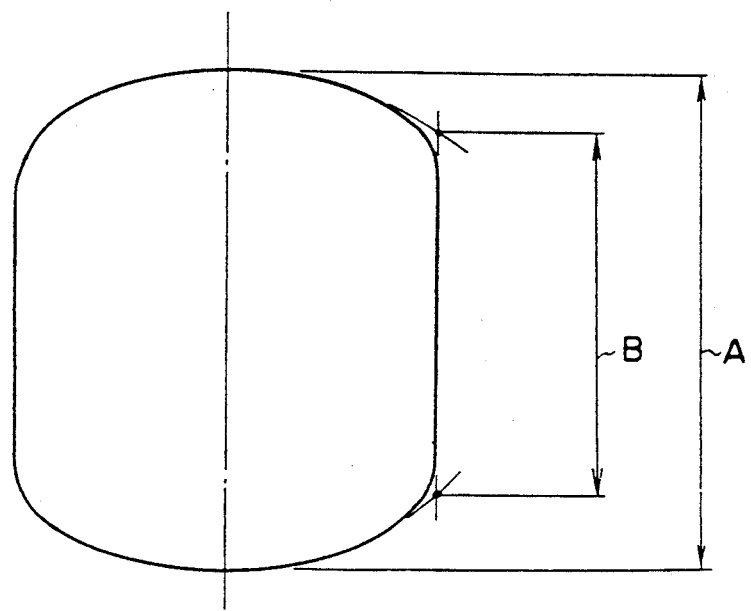
FIG. 4a is a view for explanation of a ground-contact configuration in which the ground-contact length A of a central portion is longer than the ground-contact length B of each of the pair of shoulders.
FIG. 4b is a view showing a ground-contact configuration when only the central portion of the crown is in contact with the ground under low load.
FIG. 4c is a view for explanation of a ground-contact configuration of the conventional tire with respect to a road surface.
FIG. 4d is a graphical representation showing an amount of wear at the various points e, f, g and h illustrated in FIG. 4c.
FIG. 4e is a graphical representation showing the different amounts of wear at the various points in the widthwise direction of the crown (tread) due to the dimension of the tire crown in the widthwise direction of the crown (tread) of the tire.
Figure 4:
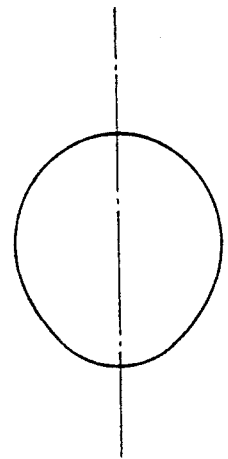
Figure 4C:
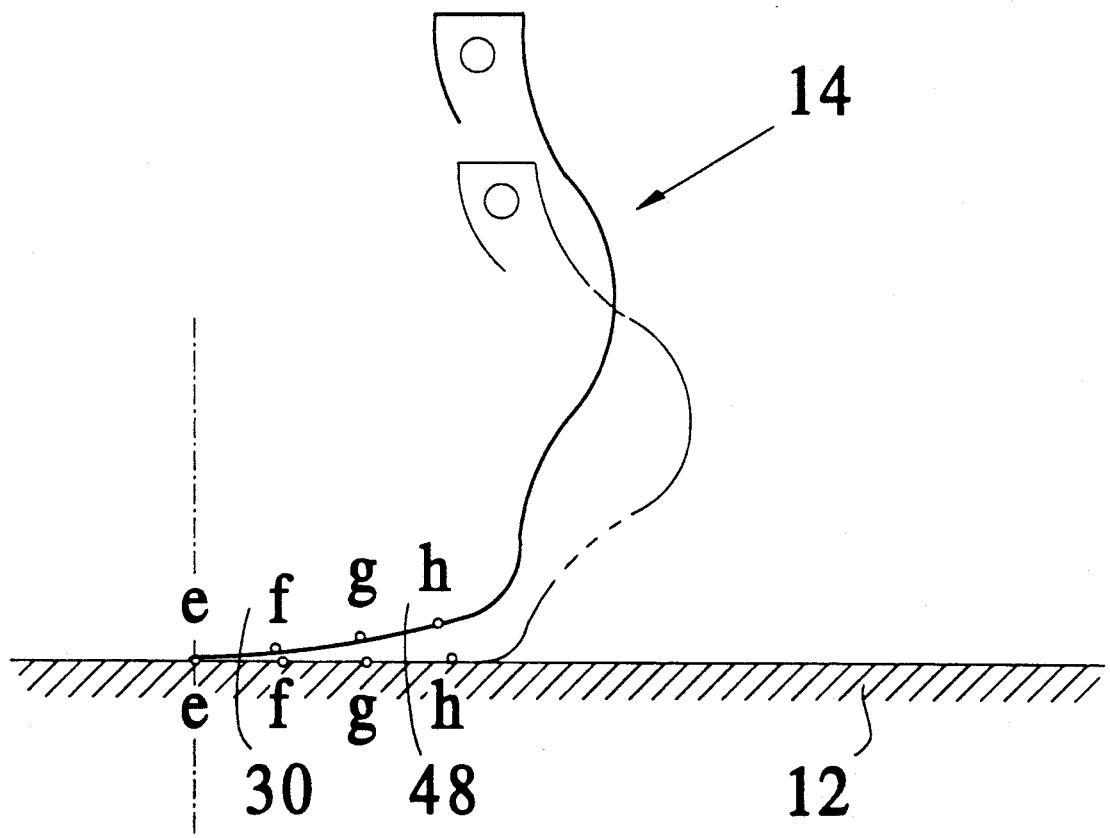

In the first embodiment, the crown 30 has a widthwise dimension CW of 140 mm, and has a radius of curvature CR of 630 mm. Accordingly, a ratio of the widthwise dimension of the radius of curvature (CR/CW) is 4.5. Thus, in the case where the tires 14 are grounded on the guide way 12 so that a load equal to or less than 45% of a full load of the linear-motor car 10 is applied to the tires 14, each of the tires 14 is deformed into a ground-contact configuration as shown in FIG. 4a. That is, it is assumed that a ground-contact length (hereinafter referred to as "ground-contact length of the central portion"), in the circumferential direction of the tire 14, of the widthwise central portion of the tire 14 is A, and a ground-contact length (hereinafter referred to as "ground-contact length of the shoulders") of the shoulders in the circumferential direction is B, and the ratio of B/A is approximately equal to 0.7. Here, if the full load is applied to the tire 14 according to the first embodiment, A<B as shown in FIG. 3. Accordingly, in the case where, for example, aircrafts, trucks, busses or the like travel under this condition, the ground-contact pressure at the shoulders 48 of the tire 14 increases, and an amount of heat generation in the portions of the rubber body 44 at the respective shoulders 48 increases. Thus, separation occurs from the both widthwise sides of the belt layers 32 of the tire 14 so that durability of the tire is considerably reduced. When the linear-motor car 10 is in this condition, however, the linear motor car 10 is stationary or in very low speed. Accordingly, there is no such problem.

The operation of the first embodiment according to the invention will be described below.

A change in a load applied to the tire 14 at take-off of the linear-motor car 10 will first be described.

As shown in FIG. 5, when the linear-motor car 10 is taking off, the load at the beginning of take-off (time t=0) is the load when the vehicle is stationary (that is 100% of the vehicle weight). When the linear-motor car 10 begins to move under the magnetic force acting between the superconductive magnets 24 and the propulsive guide coils 26, the magnetic force or levitation force acting between the superconductive magnets 24 and the levitation coils 26 increases gradually. Since the load applied to the tires 14 is the difference between the magnetic levitation force and the vehicle weight, the load applied to the tires 14 decreases gradually. As the vehicle speed gradually increases further up to a predetermined vehicle speed, the load applied to the tires 14 reduces to zero. The linear-motor car 10 is then levitated through approximately 100 mm with respect to the surface of the guide way 12 so that it is brought up to its high-speed traveling condition.

A change in the load applied to the tire 14 at the time of landing of the linear-motor car 10 will next be described.

As shown in FIG. 5, the load is zero immediately before commencement of landing. While landing, however, the load increases to a value equal to the difference between the magnetic levitation force at the landing speed and the vehicle weight. As the speed of the linear-motor car 10 is further decelerated, the magnetic levitation force decreases and the load applied to the tires 14 increases in proportion to the decrease in the magnetic levitation force. When the linear-motor car 10 finally stops, the stationary load of the vehicle (that is a load of 100% of the vehicle weight) is applied to the tires 14. In this manner, the linear-motor car 10 lands while the load applied to the tires 14 increases gradually, so that a smooth landing of the linear-motor car 10 can be achieved without giving noticeable impact to the passengers and crew.

Figure 4D:
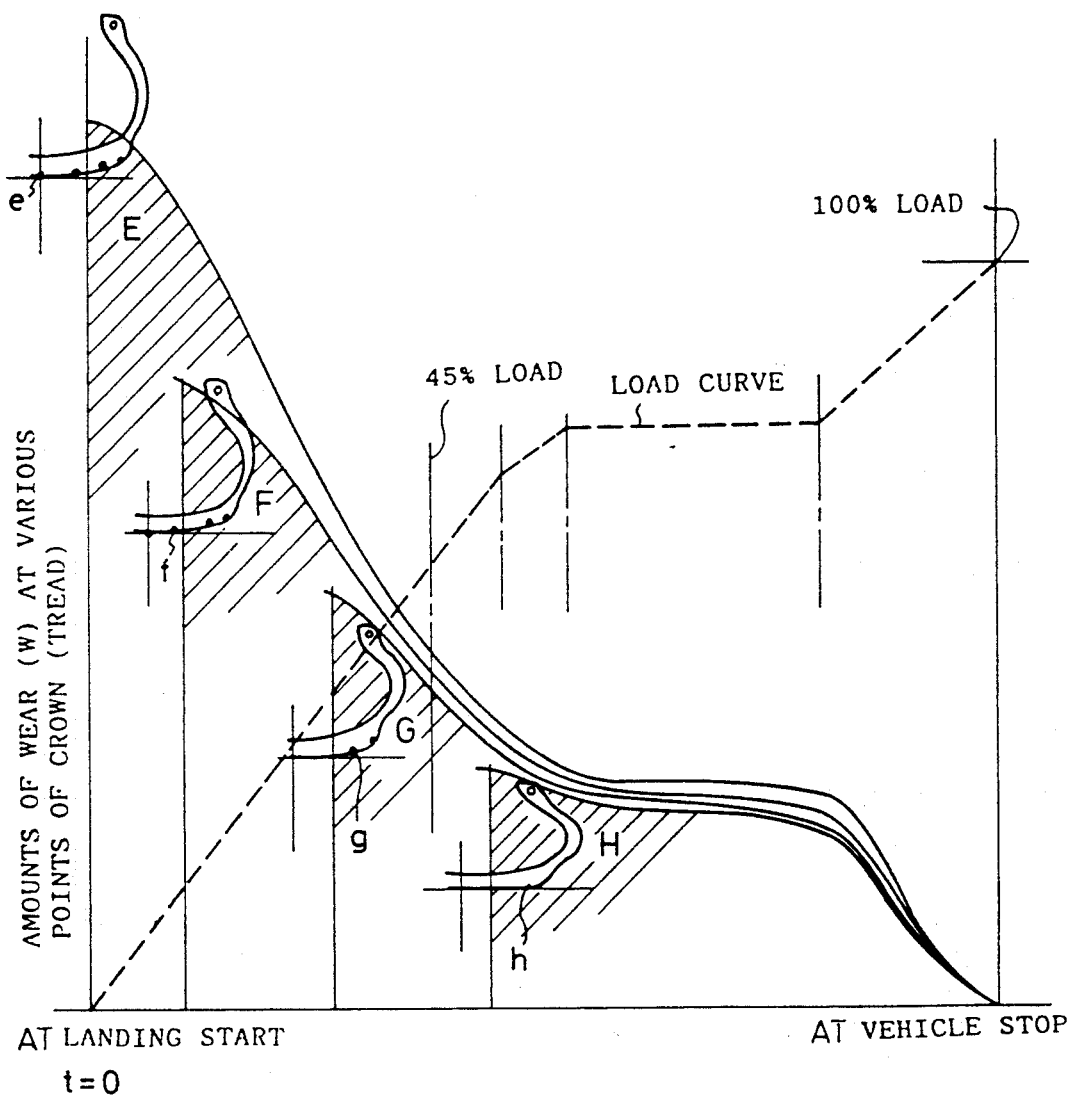

Here, at landing and take-off of the linear-motor car 10, particularly, at an initial stage of the landing, the tires 14 are rotated while being in sliding contact (slip) with the road surface of the guide way 12 under the aforesaid low-load condition and under the high-speed condition. As a result, in the case of the conventional tires each of which is designed so as to be brought into a ground-contact configuration as shown in FIG. 4a when the tire is subjected to the full load (load of 100%), only the widthwise central portion of the tire shown in FIG. 4b is grounded within the aforementioned low-speed range, i.e., under the load reaching 45% of the full load of the linear-motor car 10. Thus, wear on the tire tread, particularly, on the widthwise central portion of the tire is considerably promoted (refer to FIG. 4d). On the contrary, in the first embodiment, the ratio of the dimension CR of the radius of curvature of the crown 30 with respect to the widthwise dimension CW of the crown 30 is set to a value within a range of from 3.5 through 10.0, whereby the configuration of the tire 14 is set such that, when the load reaching 45% of the full load is applied to the tire, the ratio of the ground-contact length B of the shoulders with respect to the ground-contact length A of the center portion is brought to approximately 0.7. Accordingly, almost all of the crown 30 is in sliding contact with the road surface under the condition within the low-load range at the commencement of landing when wear is particularly violent. Thus, it is possible to prevent wear from occurring only on the central portion of the crown 30.

A table 1 attached hereto reveals the results of the first embodiment as an embodiment ①. According to the table 1, a wear-life index of the conventional tire is 100, whereas a wear-life index of the tire according to the first embodiment is 151. Thus, the wear life of the tire according to the first embodiment is considerably improved as compared with the conventional tire. In addition, as will be seen from the table 1, a durability index of the tire according to the first embodiment is also improved as compared with the conventional tire.

Second Embodiment

A second embodiment of the invention will next be described.

In the description of the second embodiment, components and parts similar to those described with reference to the first embodiment are designated by the like reference numerals, and the description of the similar components and parts will therefore be omitted.

Figure 6A:
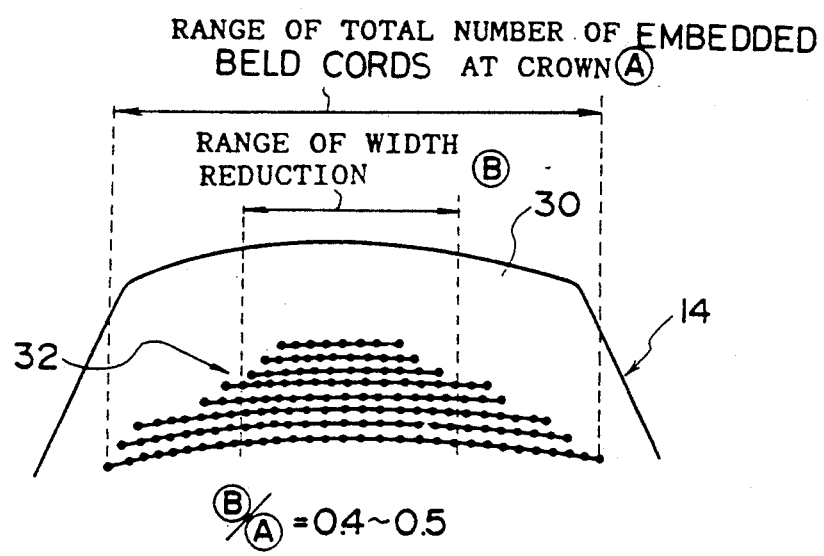
FIG. 6a is an enlarged cross-sectional view of a crown of a tire according to a second embodiment of the invention.

In the second embodiment, as shown in FIG. 6a, the tire 14 is brought to such a ground-contact configuration that, in the case where the load applied to the tire 14 is reaching 45% of the full load of the linear-motor car 10, the ratio of the ground-contact length B of the shoulders with respect to the ground-contact length A of the center portion is approximately 0.7. In this case, a ratio between a total number of embedded belt cords within 40% through 50% of the dimension of the belt layers 32 in the tire widthwise direction at the central portion of the belt layers 32 and a total number of embedded belt cords at the entirety of the crown is 0.6 through 0.75. In the second embodiment, the ratio of the number of embedded belt cords is 0.70 within the range of 45% of the dimension of the belt layers in the tire widthwise direction at the belt central portion.

As a result, the rigidity of the pair of shoulders in the vicinity of the both widthwise edges of the crown 30 is reduced as compared with that of the central portion of the crown 30, so that the ground-contact configuration in which the ratio of the ground-contact length B of the shoulders with respect to the ground-contact length A of the central portion is approximately 0.7 at the low load can be obtained. In this connection, the table 1 reveals the results of the second embodiment as an embodiment ②. According to the table 1, the wear-life index of the conventional tire is 100, whereas the wear-life index of the tire according to the second embodiment is 130. Thus, the wear life of the tire according to the second embodiment of the invention is remarkably improved as compared with the conventional tire. In addition, as will be seen from the table 1, the tire according to the second embodiment has its durability index which is also improved to 109, as compared with the conventional tire.

In the central portion of the belt layers 32, the ratio between the total number of embedded belt cords within 40% through 50% of the widthwise dimension of the tire and the total number of embedded belt cords at the entirety of the crown is set to 0.6~0.75. The reason for this will be described.

Figure 6B:
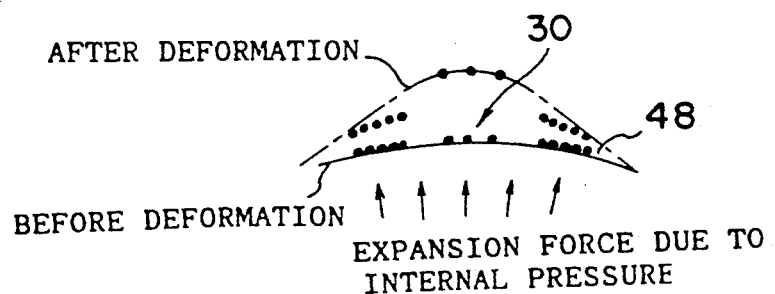
FIG. 6b is a view for explanation of deformation of the crown of the tire in the case where a number of embedded belt cords at the central portion of the crown in the widthwise direction of the tire is small.

In the case where the above-described ratio is set to a value less than 0.6, CR (dimension of the radius of curvature of the crown 30) decreases, so that it will become difficult to set CR/CW (widthwise dimension of the crown 30) to a value equal to or larger than 3.5. That is, as shown in FIG. 6b, the rigidity of the crown 30 decreases, and the belt layers at the central portion of the crown 30 are deformed due to expansion force resulting from internal pressure within the tire, so that the central portion is brought to a projecting configuration. As a result, CR decreases.

Figure 6C:
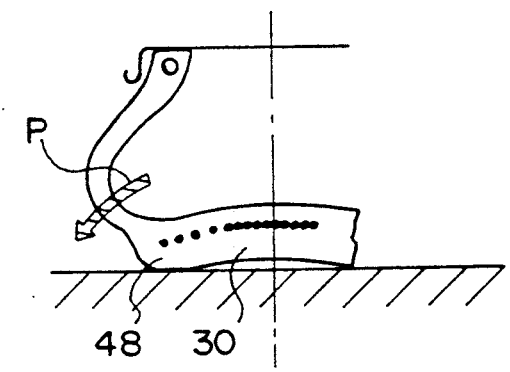
FIG. 6c is a view for explanation of deformation of the tire in the case where the number of embedded belt cords at each of the shoulders is small.
Figure 6D:
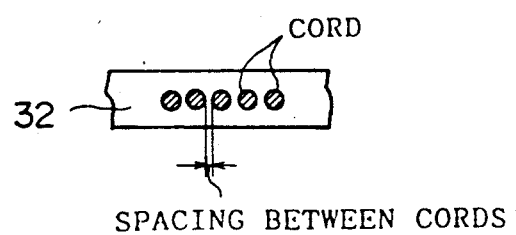
FIG. 6d is a view for explanation in the case where the number of embedded belt cords at the widthwise central portion of the crown of the tire is large.

On the other hand, in the case where the above-described ratio is set to a value exceeding 0.75, the number of embedded belt cords at the shoulders 48 of the tread 46 is considerably reduced. Thus, as shown in FIG. 6c, deformation of the shoulders 48 increases due to a load at rolling of the tire, i.e., due to force P of bending deformation at rolling of the tire, so that distortion or strain at the both edges of the belt layer increases. As a result, the possibility that separation occurs at the both edges of the belt layer becomes high, so that the durability of the tire is reduced. On the other hand, if the number of embedded belt cords at the central portion of the crown 30 increases considerably, the spacing between the cords forming the belt layers is narrowed as shown in FIG. 6d, so that the rubber coating the cords cannot be embedded between the adjacent cords. As a result, if the tire is repeatedly deformed by traveling of the vehicle to which the tire is applied, such the possibility of separation occurring between the cords and the rubber coating the cords becomes high. Thus, the durability of the tire is reduced.

Third Embodiment

A third embodiment of the invention will next be described.

In the description of the third embodiment, components and parts similar to those described with reference to the first embodiment are designated by the same reference numerals, and a description of the similar components and parts will therefore be omitted.

The tire 14 according to the third embodiment is constructed as follows. That is, the tire 14 satisfies both the ratio CR/CW of the dimension CR of the radius of curvature of the crown 30 with respect to the widthwise dimension CW of the crown 30, as described with reference to the first embodiment, and the ratio between the total number of embedded belt cords within the range of 40% through 50% of the belt layers widthwise dimension and the total number of embedded belt cords of the entirety of the crown, as described with reference to the second embodiment.

Experimental results in which the tire 14 constructed as described above is used to conduct experiments, are revealed in the table 1 as an embodiment ③. According to the table 1, the wear-life index of the conventional tire is 100, whereas the wear-life index of the tire according to the third embodiment is 161. Thus, the tire according to the third embodiment has a wear life which is considerably improved, as compared with the conventional tire. In addition, the wear-life index of the tire according to the third embodiment is further improved as compared with the wear-life index of each of the first and second embodiments. Moreover, as will be seen from the table 1, the tire according to the third embodiment has a durability index which is also improved to 113, as compared with the conventional tire.

Fourth Embodiment

Figure 7:
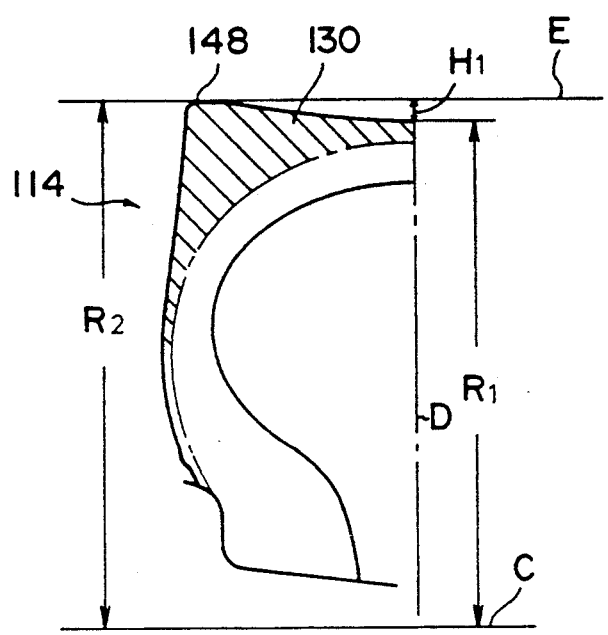
FIG. 7 is a partial cross-sectional view of a tire through a rotational axis of the tire according to a fourth or a fifth embodiment of the invention.

In a fourth embodiment, a concave configuration of a crown 130 in a tire 114 will be described with reference to FIGS. 7 and 8.

The tire 114 is constructed as follows.

A distance $R_1$ from a tire rotational axis C in an equatorial plane D to a surface of the crown 130 under a no-load condition after filling to a normal internal pressure is minimized. A distance $R_2$ from the tire rotational axis C to the neighborhood of a pair of shoulders 148 is maximized. A diameter increases gradually from the equatorial plane D toward the neighborhood of the shoulders 148. Thus, an outer contour configuration of the crown 130 in a cross-section passing through the tire rotational axis C is formed into a concave configuration.

Figure 8:
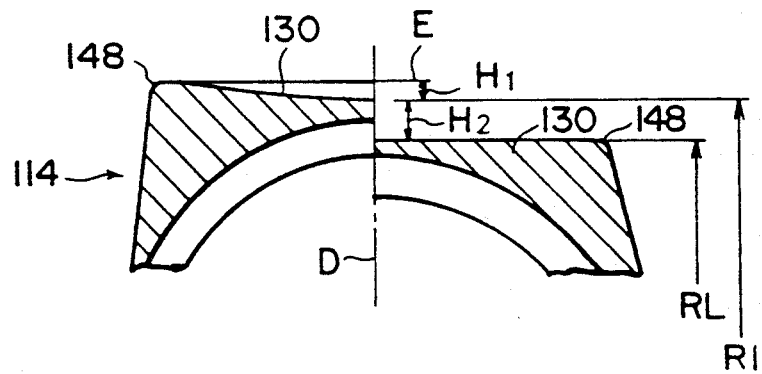
FIG. 8 is a partial cross-sectional view of the tire according to the fourth or fifth embodiment of the invention, showing a configuration of the tire under a no-load condition and a configuration of the tire under a full-load condition.

Further, as shown in FIG. 8, the tire 114 is constructed as follows. That is, a distance from an intersection between a line E connecting both the shoulders 148 to each other and the equatorial plane D under the no-load condition, to the surface of the crown 130 on the equatorial plane D is $H_1$. A distance from the surface of the crown 130 on the equatorial plane D under the no-load condition to the surface of the crown 130 on the equatorial plane D under the full load condition is $H_2$. That is, a length, in which a distance RL from the tire rotational axis C on the equatorial plane D under the full load condition to the surface of the crown 130 is subtracted from the distance $R_1$, is brought to $H_2$.

Experimental results, in which the tire constructed as above is used to conduct experiments, are revealed in the table 1.

The table 1 shows the third embodiment as an embodiment ④, and a comparative example with respect to the third embodiment as a comparative example 1.

According to the table 1, the wear-life index of the tire according to the third embodiment is considerably improved as compared with the conventional tire. On the other hand, the tire according to the comparative example 1 is improved in its wear-life index, but the durability index of the comparative example 1 results in a reduction as compared with the conventional tire.

Figure 9:
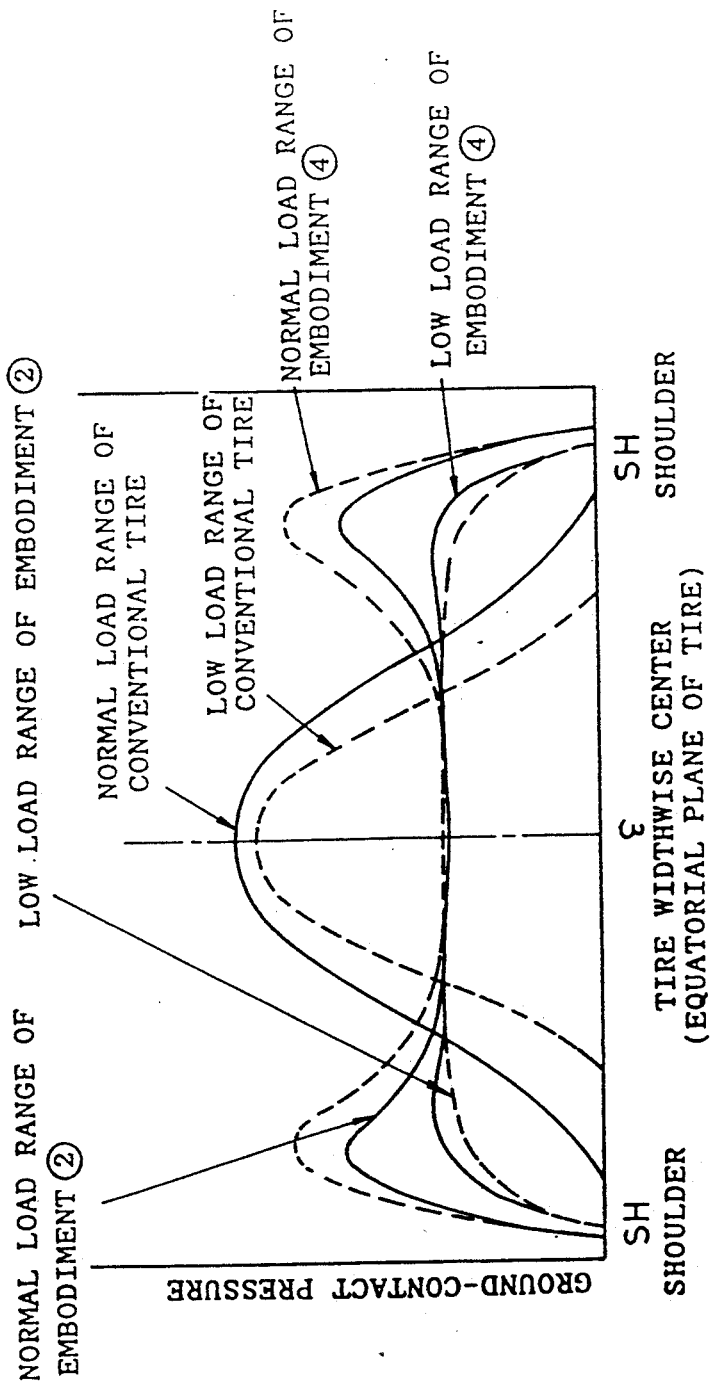
FIG. 9 is a graphical representation of a distribution of ground-contact pressure of the tire.

FIG. 9 shows a distribution of the ground-contact pressures at various positions of the crown in the tire widthwise direction of the conventional tire and the tire according to the embodiment 2 or 4.

It will be seen from FIG. 9 that the tire according to the embodiment 2 or 4 is low in ground-contact pressure in the neighborhood of the equatorial plane D, as compared with the conventional tire, and the ground-contact pressure in the neighborhood of the shoulders is high, so that the ground-contact pressure in the tire widthwise direction is made uniform as a whole.

Figure 11:
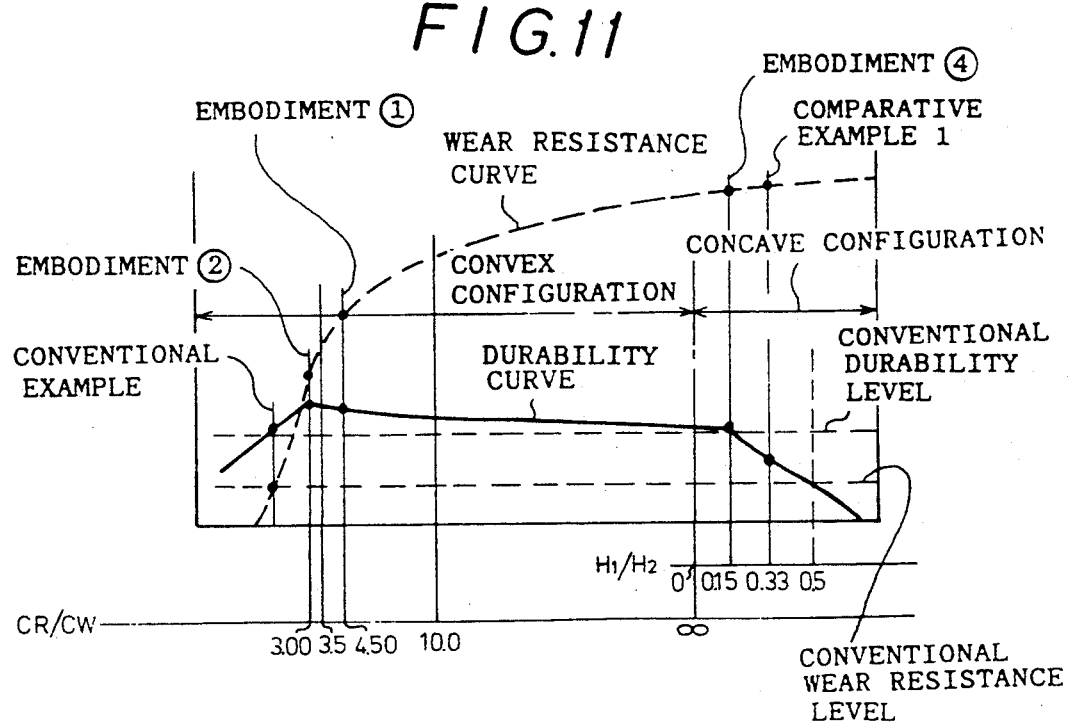
FIG. 11 is a graphical representation showing comparison in performance among the tires of the first, second and fourth embodiments of the invention, the conventional example and a comparative example 1.
Figure 12:
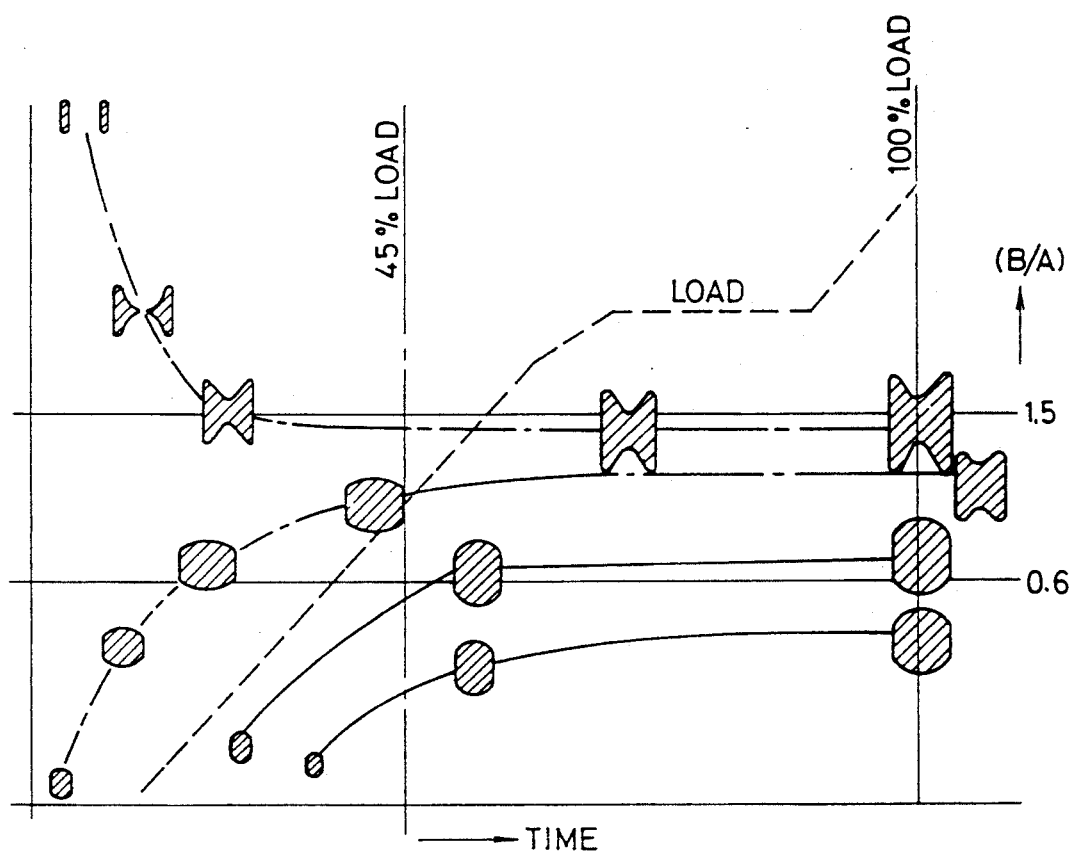
FIG. 12 is a diagram for explanation of the effect of the area of the ground-contact configuration of the tire according to the invention.

FIG. 11 shows a graph expressing a relationship between the conventional tire, the first, second and fourth embodiments of the invention and the comparative example 1. According to FIG. 11, it will be seen that the tire according to the first, second or fourth embodiments of the invention is superior to the conventional tire and the tire according to the comparative example 1 in both wear resistance and durability.

Fifth Embodiment

A fifth embodiment of the invention will next be described.

A tire according to the fifth embodiment is similar in construction to the fourth embodiment. Detailed data are shown in table 2 as an embodiment ⑤.

Further, in table 2, comparative examples with respect to the fifth embodiment are given as comparative examples 2 and 3.

As will be seen from the table 2, the tire according to the fifth embodiment has a greater total amount of wear at the crown up until a tire replacement limit than the comparative example 2, and is superior also in durability to the comparative example 3.

In connection with the above, the results shown in the table 2 are for experiments under such conditions that the outer diameter is 450 mm, the maximum load of the tire is 375 kg, and the internal pressure is 6.5 kg/cm$^2$.

In table 2, the total amount of wear at the tread is defined as follows.

In traveling of an actual vehicle (experimental vehicle), a total amount of wear of rubber at the tread (crown) until a wear indicator appears is defined as being a total amount of wear at the tread. A limit of wear at the appearance of the wear indicator is defined as follows. That is, a single thin canvas is embedded in rubber at the lower portions of respective groove bottoms in the tire tread. When the grooves are worn off, the canvas appears on the surface of the tread. The time of appearance of the canvas is defined as being the limit of wear. The more the total amount of wear at the tread, the longer the vehicle travels. Thus, it is assessed that the tire is a long life tire.

Further, the durability is defined as follows.

A drum tester within a room is used, and a normal load is applied to a tire to run the same through 60 km at a speed of 200 km/h. It is assessed whether or not separation has occurred at an internal member (particularly, both edges of the belt layers in the widthwise direction) within the tire after traveling of 60 km.

The comparative example 3 is superior in the total amount of wear at the tread, but inferior in durability. The comparative example 3 is assessed poor synthetically.

Further, it is preferable that the aforesaid distance $H_1$ is equal to or less than 50% of a maximum amount of deflection of the tire 114 on the equatorial plane D. That is, FIG. 8 shows a comparison between the state of a no-load and the state of a load. It is preferable that $H_1/H_2 \leq 0.5$.

The reason for the above is as follows. That is, if the distance $H_1$ exceeds 50% of the maximum amount of deflection of the tire 114 on the equatorial plane D, the ground-contact pressure at the shoulders 148 and the deformation of the inner side of the crown, that is, the casing are excessive. Thus, heat generation at the crown is caused or induced so that troubles such as separation between components and the like tend to occur. Particularly, an excessive load is applied to the shoulders, and the distortion or strain at this portion and the amount of heat generation increases so that separation is caused to occur at the both edges of the belt layer within the tire.

Further, it is preferable that, in order to improve the wear resistance and the durability of the tire 114, the crown 130 has a width which is 90% through 110% of the maximum width in the tire cross-section so that the mean ground-contact pressure is reduced.

The reason for the above will be described below.

Figure 10:
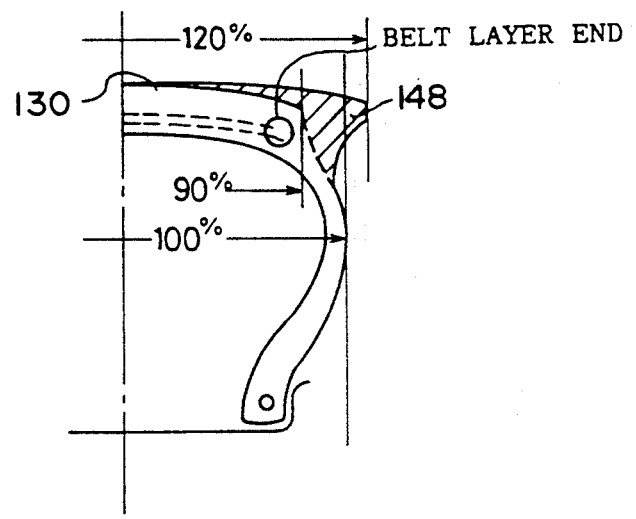
FIG. 10 is a partial cross-sectional view of a tire for explanation of a condition of the crown of the tire in the case where CW/SW exceeds 110%.

The conventional tire is generally designed such that the width (CW) of the crown/the maximum width (SW) in the tire cross-section is 70±10%. In the case of a vehicle which is provided with tires in sliding contact with the road surface running at high speed during a low load such as a linear-motor car, however, if the crown 130 has a width which is set to a value less than 90% of the maximum width in the tire cross-section, there is a fear that the ground-contact pressure at the crown 130 becomes excessive so that heat generation at the crown 130 is induced. Further, the crown 130 can be designed wide by setting to this value, whereby it is possible to increase the amount of wear up until the tire turning-down limit of rubber at the crown 130. On the other hand, if the crown 130 has a width which exceeds 110% of the maximum width in the tire cross-section, that is, if the width of the crown 130 is excessively wide, an increase in the amount of rubber at the shoulders 148 increases an amount of heat generation at the shoulders 148 during rolling of the tire under a load condition, as shown in FIG. 10. Fatigue of the rubber in the vicinity of both edges of the belt layers in the widthwise direction (in the vicinity of the shoulders 148) embedded in the crown 130 is promoted so that separation occurs between cords of the belt layers and the rubber coating the cords. Further, it is made difficult to hold or retain the rigidity of the crown 130 so that troubles such as tread separation and so on occur.

TABLE 1

| | | <EMBODIMENT> | | | | |
|---|---|---|---|---|---|---|
| | CONVEN-TIONAL | EMBODI-MENT ① | EMBODI-MENT ② | EMBODI-MENT ③ | EMBODI-MENT ④ | COMPARATIVE EXAMPLE 1 |
| MEANS | — | ① | ② | ① + ② | CONCAVE CONFIG-URATION | $\overline{H}_1 = 10$ mm |
| CW | 140 mm | 140 mm | 140 mm | 140 mm | 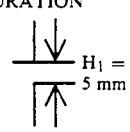 | |
| CR | 180 mm | 630 mm | 420 mm | 630 mm | 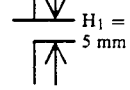 | |
| CR/CW | 1.29 | 4.50 | 3.00 | 4.50 | $H_1/H_2 = 0.15$ | $H_2/H_2 = 0.33$ |
| EMBEDDED BELT CORDS RATIO | 0.45 | 0.45 | 0.70 | 0.70 | 0.45 | 0.45 |
| GROUND-CONTACT LENGTH DURING NORMAL LOAD  A | 211 mm | 251 mm | 257 mm | 247 mm | 237 mm | 230 mm |
| GROUND-CONTACT LENGTH DURING NORMAL LOAD  B | 193 mm | 273 mm | 267 mm | 285 mm | 290 mm | 301 mm |
| GROUND-CONTACT LENGTH DURING 40% LOAD  A | 70 mm | 135 mm | 132 mm | 131 mm | 110 mm | 97 mm |
| GROUND-CONTACT LENGTH DURING 40% LOAD  B | NOT GROUNDED | 98 mm | 95 mm | 100 mm | 139 mm | 152 mm |
| GROUND-CONTACT LENGTH DURING 40% LOAD  B/A | — | 0.73 | 0.72 | 0.76 | 1.26 | 1.57 |
| WEAR LIFE INDEX | 100 | 151 | 130 | 161 | 193 | 199 |
| *DURABILITY INDEX | 100 | 106 | 109 | 113 | 103 | 91 |

In connection with the above.
Tire Outer Diameter: 674 mm
Tire Maximum Width: 190 mm
Rim Diameter: 14"
Air Pressure: 7.9 kg/cm²
*Durability Index
Time till occurrence of troubles in case of continuous traveling at 200 km/h under normal load of 2500 kg.

TABLE 2

| | EMBODI-MENT ⑤ | (CONVEN-TIONAL EXAMPLE) COMPARATIVE EXAMPLE 2 | COMPARA-TIVE EXAMPLE 3 |
|---|---|---|---|
| TIRE OUTER DIAMETER | 450 mm | 450 mm | 450 mm |
| TREAD | 130 mm | 105 mm | 130 mm |

TABLE 2-continued

|  | EMBODIMENT 5 | (CONVENTIONAL EXAMPLE) COMPARATIVE EXAMPLE 2 | COMPARATIVE EXAMPLE 3 |
|---|---|---|---|
| WIDTH TIRE CROSS-SECTIONAL MAXIMUM WIDTH | 140 mm | 140 mm | 140 mm |
| $H_1$ | 3.5 mm | −7.0 mm | 4.7 mm |
| $H_2$ | 8.9 mm | 8.5 mm | 8.1 mm |
| $H_1/H_2$ | 0.39 | −0.82 | 0.58 |
| TOTAL AMOUNT OF WEAR AT TREAD | 800 cc | 245 cc | 990 cc |
| DURABILITY | NO TROUBLE | NO TROUBLE | SEPARATION OF TREAD |

Maximum Load: 375 kg
Internal Pressure: 6.5 kg/cm$^2$
Durability is based on traveling from 60 km at a speed of 200 km/h under normal load.

What is claimed is:

1. A levitation-type vehicle having at least one tire, said tire comprising at least one ply-cord layer forming a carcass having a plurality of cords which are arranged substantially in a radial direction, in which a plurality of belt layers composed of a plurality of reinforcing cord layers are interposed at a crown between an outer surface thereof and said carcass, and in which a load which varies depending upon a change in speed of said levitation-type vehicle is supported at landing and during subsequent traveling thereof, wherein at least one of a configuration of said crown and rigidity of said crown is set so as to have a ground-contact configuration in which a ratio (B/A) of a ground-contact length (hereinafter referred to as "ground-contact length of shoulders") B of a pair of shoulders of said crown in a rotational direction of the tire for the levitation-type vehicle with respect to a ground-contact length (hereinafter referred to as "ground-contact length of a central portion") A of a substantially widthwise central portion of said crown in the rotational direction of the tire for said levitation-type vehicle is 0.6∼1.5 when a load reaching 45% of a full load of said vehicle from a non-loaded state is applied to said tire, wherein the configuration of said crown CR is set such that a ratio of a dimension of a radius of curvature of said crown with respect to a dimension of said crown in the widthwise direction CW of the tire for said levitation-type vehicle is at least 3.5, said plurality of belt layers having parts which are short in width, and wherein a ratio of a total number of embedded belt cords within 40%∼50% of a maximum width dimension of said belt layers with respect to a total number of embedded belt cords in the entirety of said crown is 0.6∼0.75 in a central portion of said belt layers in the widthwise direction, whereby the rigidity of said crown increases in the vicinity of the central portion of the tire for said levitation-type vehicle in the widthwise direction thereof.

2. The levitation-type vehicle, according to claim 1, wherein the configuration of said crown is set such that the ratio of the dimension of the radius of curvature of said crown with respect to the dimension of said crown in the widthwise direction of the tire for said levitation-type vehicle is at most 10.0.

3. The levitation-type vehicle, according to claim 1, wherein the configuration of said crown is such that an outer peripheral surface of said crown is concave in shape in a cross-section in the widthwise direction.

4. The levitation-type vehicle, according to claim 3, wherein a distance from a center of a line connecting both said shoulders of said crown to each other to the surface of said crown on the equatorial plane in the widthwise direction at the time of non-load is set to a value of at most 50% of a distance from the surface of the crown on the equatorial plane under the nonload condition to the surface of the crown on the equatorial plane under the full load condition.

5. The levitation-type vehicle, according to claim 3, wherein said crown has a width which is set to a value at least 90% and at most 110% of a tire maximum width in a cross-section in the radial direction of the tire for said levitation-type vehicle.

6. The levitation-type vehicle, according to claim 4, wherein said crown has a width which is set to a value at least 90% and at most 110% of a tire maximum width in a cross-section in the radial direction of the tire for said levitation-type vehicle.

7. A levitation-type vehicle having at least one tire, said tire comprising a carcass composed of at least one ply-cord layer having a plurality of cords arranged substantially in a radial direction, and a crown having a plurality of belt layers interposed between an outer surface of said crown and said carcass, said plurality of belt layers being composed of a plurality of reinforcing cord layers, in which a load is supported which varies depending upon a change in speed of said levitation-type vehicle at landing and during subsequent traveling thereof, wherein a configuration of said crown and rigidity of said crown are so set as to have a ground-contact configuration in which a ratio (B/A) of a ground-contact length (hereinafter referred to as "ground-contact length of shoulders") B of a pair of shoulders of said crown in a circumferential direction of the tire for the levitation-type vehicle with respect to a ground-contact length (hereinafter referred to as "ground-contact length of a central portion") A of a substantially widthwise central portion of said crown, in the circumferential direction of the tire for said levitation-type vehicle, is 0.6∼1.5 when a load reaching 45% of a full load of said vehicle from a non-loaded state is applied to said tire, wherein the configuration of said crown CR is set such that a ratio of a dimension of a radius of curvature of said crown with respect to a dimension of said crown in the widthwise direction CW of the tire for said levitation-type vehicle is at least 3.5, said plurality of belt layers having parts which are short in width, and wherein a ratio of a total number of embedded belt cords within 40%∼50% of a maximum width dimension of said belt layers with respect to a total number of embedded belt cords in the entirety of said crown is 0.6∼0.75 in a central portion of said belt layers in the widthwise direction, whereby the rigidity of said crown increases in the vicinity of the central portion of the tire for said levitation-type vehicle in the widthwise direction thereof 8. The levitation-type vehicle, according to claim 7, wherein the configuration of said crown is set such that the ratio of the dimension of the radius of curvature of said crown with respect to the dimension of said crown in the widthwise direction of the tire for said levitation-type vehicle is at most 10.0.

9. The levitation-type vehicle, according to claim 7, wherein the configuration of said crown is such that an outer peripheral surface of said crown is concave in shape in a cross-section in the widthwise direction.

10. The levitation-type vehicle, according to claim 9, wherein said concave configuration is such that its depth becomes gradually deep from said shoulders of said crown toward the central portion of said crown in the widthwise direction.

11. The levitation-type vehicle, according to claim 10, wherein a distance from a center of a line connection both said shoulders of said crown to each other to the surface of said crown on the equatorial plane in the widthwise direction is set to a value of at most 50% of a distance from the surface of the crown on the equatorial plane under the non-load condition to the surface of the crown on the equatorial plane under the full load condition.

12. The levitation-type vehicle, according to claim 10, wherein said crown has a width which is set to a value at least 90% and at most 110% of a tire maximum width in a cross-section in the radial direction of the tire for said levitation-type vehicle.

13. The levitation-type vehicle, according to claim 11, wherein said crown has a width which is set to a value at least 90% and at most 110% of a tire maximum width in a cross-section in the radial direction of the tire for said levitation-type vehicle.

* * * * *